United States Patent
Sato et al.

(10) Patent No.: US 6,357,923 B1
(45) Date of Patent: Mar. 19, 2002

(54) ROLLING BEARING AND BEARING DEVICE

(75) Inventors: Chuichi Sato; Yuichi Sumita; Shoji Horike; Tsuyoshi Saito; Dai Kinno, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/549,164

(22) Filed: Apr. 13, 2000

(30) Foreign Application Priority Data

Feb. 19, 1999 (JP) ............................................. 11-045144
Feb. 23, 1999 (JP) ............................................. 11-045145
Apr. 14, 1999 (JP) ............................................. 11-106935

(51) Int. Cl.[7] ................................................ F16C 33/44

(52) U.S. Cl. ..................................... 384/492; 384/907.1

(58) Field of Search .............................. 384/492, 491, 384/569, 907, 907.1, 913

(56) References Cited

U.S. PATENT DOCUMENTS

| | | | | |
|---|---|---|---|---|
| 5,284,394 A | * | 2/1994 | Lemelson | 384/463 |
| 5,593,234 A | | 1/1997 | Liston | 384/492 |
| 5,700,546 A | * | 12/1997 | Fujii et al. | 428/156 |
| 6,095,692 A | * | 8/2000 | Takemura | 384/492 |

FOREIGN PATENT DOCUMENTS

| | | | | |
|---|---|---|---|---|
| JP | 58174718 A | * | 10/1983 | ............... 384/492 |
| JP | 04360077 | | 12/1992 | |
| JP | 05-149343 | | 6/1993 | |
| JP | 06193637 A | * | 7/1994 | ............... 384/492 |
| JP | 07127644 | | 5/1995 | |
| JP | 07282551 | | 10/1995 | |
| JP | 11-218134 | | 8/1999 | |
| WO | WO98/44270 | | 10/1998 | |
| WO | WO99/14512 | | 3/1999 | |

OTHER PUBLICATIONS

Manfred Berger, "Verschleifsschutzschichten für Zahnräder und Wälzlager", *Antriebstechnik* 30, No. 12, pp 50–53 (1991).

Von W. Sebler and O. Rist, "Dünne Schichen im Kugellager", *Tribologie + Schmierungstechnik* 44, vol. 2, pp. 70–72 (1997).

Von M. Laakmann, "PVD–Hartstoffschichten für Präzisionsbauteile", *Tribologie + Schmierungstechnik* 42, vol. 6, pp. 310–314 (1995).

"Amorpher Kohlenstoff mit gutem Schmierverhalten, Diamantartige Schichten schützen vor Verschleifs", *Industrieanzeiger*, pp. 36–37 (Jul. 1996).

Manfred Weck and Jochen Leng, "Einsatzmöglichkeiten von PVD–Schichten auf wälzbeanspruchten Bauteilen", *Antriebstechnik* 35, No. 5, pp. 41–43 and 129.

Balzers' Guide for improving a reliability of precision parts, 1995, title page, table of contents, pp. 3, 5–7, 9–31, 33–35, 37–39 and back cover (including partial English translation).

*Evolution Technology*, "Hard coating for heavy bearing duty," Hultman et al, pp. 28–30.

(List continued on next page.)

Primary Examiner—Thomas R. Hannon
(74) Attorney, Agent, or Firm—Sughrue Mion, PLLC

(57) ABSTRACT

As a ball for ball bearing there is provided a ceramics-coated ball made of a steel having almost the same linear thermal expansion coefficient as that of the bearing ring of the ball bearing and coated with a ceramics material. In this arrangement, even when the temperature during bearing assembly and the working temperature differs from each other, the release of preload or excessive preload can be prevented as in ceramics ball because the bearing and the ball can expand or shrink in the same manner. Further, since the ball and the bearing ring contact with each other via the ceramics layer, fretting abrasion can be prevented, making it possible to obtain excellent running performance and acoustic properties.

15 Claims, 8 Drawing Sheets

OTHER PUBLICATIONS

*Surface and Coatings Technology 86–87*, "Application of low temperature PVD coatings in rolling bearings: tribological tests and experiences with spindle bearing systems," Igartua et al, pp. 460–466 (1996).

*Wear 215*, "A study of rolling–contact fatigue of bearing steel coated with physical vapor deposition TiN films: Coating response to cyclic contact stress and physical mechanisms underlying coating effect on the fatigue life," Polonsky et al, pp. 191–204 (1998).

*Bearing Steels into the 21$^{st}$ Century*, "Rolling Contact Fatigue Properties of TiN/NbN Superlattice Coatings on M–50 Steel," Liston, pp. 499–510.

* cited by examiner

1: MAIN PLANE OF CURVATURE
2: MAIN PLANE OF CURVATURE
OBJECT I
CONTACT ELLIPSE A
OBJECT II

1: MAIN PLANE OF CURVATURE   2: MAIN PLANE OF CURVATURE
OBJECT I
OBJECT II

ROLLING BEARING AND BEARING DEVICE

BACKGROUND OF THE INVENTION

1. Field of the Invention

The present invention relates to a ball bearing comprising a surface-coated metal ball. More particularly, the present invention relates to a bearing suitable for hard disk drive (hereinafter referred to as "HDD") spindle motor device or the like comprising rolling elements which have a hard ceramic coating film or diamond-like carbon coating film formed on the surface thereof to exhibit an enhanced fretting resistance and prevent the unintentional release of preload due to temperature change.

2. Description of the Related Art

Despite its shorter history than other industries, the computer-related industries are making an extremely rapid technical innovation. In particular, HDD industry has introduced new techniques to make successive development of new compact models having a smaller power loss requirement, a high response and a high precision. Under these circumstances, bearing performance corresponding to these properties has been required.

Referring to bearing for HDD device, for example, a small-sized deep groove ball bearing is often used for spindle motor shown in FIG. 6 and swing arm motor shown in FIG. 7. The ball bearing 1 for spindle motor is used to allow a cup-shaped flange 2 on which a magnetic disc (not shown) is mounted to be smoothly driven rotatively around a shaft 4 provided standing on a base 3 by a motor M. Thus, the ball bearing 1 is required to have remarkably excellent running performance and acoustic properties. The ball bearing 1 for swing arm is used to allow a swing arm 7 to be swung smoothly around a shaft 9 provided on a base 8. The swing arm 7 allows a head 6 to be accessed and positioned on the effective area on a magnetic disc D. A preload is applied to these ball bearings 1 at room temperature to enhance the shaft supporting rigidity. However, since the motor for HDD device is required to have a reduced size, constant-pressure preload process, which requires some space, cannot be employed. Therefore, constant-position preload process is employed in which an inner race $1n$ and an outer race $1g$ of two ball bearings are fixed to shafts 4, 9 and the inner wall of a flange 2 or sleeve 10 as a rotary body, respectively, with an adhesive while being pressured by applying a load downward.

As the material of ball bearing to be used in the foregoing HDD device, there is often used SUJ2 (JIS), which is a high carbon chromium bearing steel, SUS440C (JIS) which is a martensitic stainless steel, 0.7C—13Cr stainless steel, or the like. These steel materials are hardened and tempered to obtain desired hardness or wear resistance. Thus, steel materials, the hardness of which has HRC of 58 to 64 are used.

However, the ball bearing 1 for HDD device is subject to adverse effect on acoustic properties or vibration properties due to fretting wear developed by the microvibration of the rotary portions (flange 2, sleeve 10) in the rotating direction during the transportation of the device. Fretting wear takes place on the balls B in the bearing 1. As a countermeasure against fretting abrasion, the use of ceramics as bearing ball B has begun. This is because the surface properties, hardness, mechanical strength, chemical stability and wear resistance of ball made of ceramics are better than that of ball made of steel such as bearing steel.

The ball made of ceramics has excellent surface properties but has a linear thermal expansion coefficient which is 70% smaller than that made of steel and a modulus of a longitudinal elasticity which is 50% greater than that made of steel. Thus, when the temperature rises during the use of the device, ball bearings employing constant-position preload process such as one for motor for HDD device is subject to great. change in the maximum contact stress between ball and its rolling surface such as to cause a great drop in the bearing rigidity (preload). Thus, in an extreme case; so-called release of preload, i.e., zeroing of preload during use can take place.

Referring to the possibility of release of preload, its mechanism will be studied hereinafter.

Referring to elastic deformation and stress on the contact area at which the ball comes in rolling contact with the rolling surface, Herz's theory of elastic contact can be applied. In general, as shown in FIG. 8A, when two objects I and II which are elastic materials having a smooth surface come in contact with each other, main planes of curvature 1 and 2 crossing each other at right angle in symmetrical planes exist in the vicinity of the contact point. As shown in FIG. 8B, the object I has radii $r_{I1}$ and $r_{I2}$ of main curvature in the section of main planes of curvature, respectively. The object II has radii $r_{II1}$ and $r_{II2}$ of main curvature in the section of main planes of curvature, respectively. The reciprocal of these radii $r_{I1}$, $r_{I2}$, $r_{II1}$ and $r_{II2}$ of main curvature (distinguished by signs + and –, which means that the curvature is convex or concave, respectively) are defined to be $\rho_{I1}$, $\rho_{I2}$, $\rho_{II1}$ and $\rho_{II2}$, respectively.

Formed at the contact area is a contact ellipsoid A having two radii (major radius a and minor radius b) crossing each. other.

Supposing that when a vertical load Q is applied to the contact ellipsoid A, the maximum contact stress acting on the. center of the contact ellipsoid A is $\sigma_{max}$ and the amount by which the elastic objects I and II displacement each other is $\delta$, $\sigma_{max}$ and $\delta$ can be given by the following equations, respectively.

$$\sigma_{max} = 3/2\pi \cdot 1/\mu\nu \cdot \sqrt[3]{[1/(3/2)^2\{(1-1/m^2{}_I)/E_I + (1-1/m^2{}_{II})/E_{II}\}^2 \cdot (\Sigma\rho)^2 \cdot Q]}$$

$$\delta = 3/4 \cdot 2k/\pi\mu \cdot \sqrt[3]{[2/3 \cdot \{(1-1/m^2{}_I)/E_I + (1-1/m^2{}_{II})/E_{II}\}^2 \Sigma\rho \cdot Q^2]}$$

A further study will be made by applying the foregoing equations to the contact of ball B with the rolling surface in the outer race $1g$ and the rolling surface in the inner race $1n$ in a deep groove ball bearing 1 as shown in FIG. 9. It is supposed that the ball B is made of ceramics and the outer race $1g$ and inner race $1n$ are made of steel.

The ceramics has a modulus of longitudinal elasticity $E_1$ of 313.6 GPa, a Poisson's ratio $m_1$ of 10/2.7, a linear thermal expansion coefficient $A_1$ of $3.2 \times 10^{-6}/°$ C. (same as that of silicon nitride $Si_3N_4$) and a thermal conductivity $B_1$ of 10.8 W/(m·k).

The steel has a modulus of longitudinal elasticity $E_{II}$ of 207.8 GPa, a Poisson's ratio $m_{II}$ of 10/3, a linear thermal expansion coefficient $A_{II}$ of $11.8 \times 10^{-6}/°$ C. and a thermal conductivity $B_{II}$ of 76 W/(m·k). In the linear thermal expansion coefficient, an average of minimum and maximum are used among that of representative steel materials, i.e., martensite stainless steel ($10.1 \times 10^{-6}$), bearing steel SUJ2 ($12.5 \times 10^{-6}$), middle, low carbon steel ($13.5 \times 10^{-6}$), to which the invention is applied.

The maximum contact stress $\sigma_{max}$ and the displacemnet $\delta$ are represented by the following equations:

$$\sigma_{max}=210\times(1/\mu v)_3\sqrt{\{\Sigma\rho\}^2 Q\}} \quad (1)$$

$$\delta=(1.13/10^3)(2K/\pi\mu)_3\sqrt{\{\Sigma\rho Q^2\}} \quad (2)$$

wherein $\mu v$ and $2K/\pi\mu$ are a function of $\rho$.

Supposing that in FIG. 9 the diameter of ball B is d, the radius of curvature of the curved surface of groove in the section of the race groove on the outer race $1g$ including the bearing axis is $r_0$, the radius of curvature of the curved surface of groove in the section crossing the bearing axis at right angle is $R_0$, the radius of curvature of the curved surface of groove in the section of the race groove on the inner race $1n$ including the bearing axis is $r_i$, and the radius of curvature of the curved surface of groove in the section crossing the axis 1 at right angle is $R_i$, the sum of main curvatures $\Sigma\rho=\rho_{I1}+\rho_{I2}+\rho_{II1}+\rho_{II2}$ is represented by the following equations:

For the contact of inner race with ball, $$\Sigma\rho=4/d+(1/R_i)-(1/r_i) \quad (3)$$

For the contact of outer race with ball, $$\rho\rho=4/d+(1/R_0)-(1/r_0) \quad (4)$$

The auxiliary variable $\cos\tau=|(\rho_{I1}-\rho_{I2})+(\rho_{II1}-\rho_{II2})|/\Sigma\rho$ is represented by the following equations:
For the contact of inner race with ball, $$\cos\tau=\{(1/r_i)+(1/R_i)\}/\Sigma\rho \quad (5)$$

For the contact of outer race with ball, $$\cos\tau=\{(1/r_0)+(1/R_0)\}/\Sigma\rho \quad (6)$$

Since the spring constant k is $dQ/d\delta$, $$k=1/\{(1.13/10^3)(2K/\pi\mu)\}\cdot 3/2\cdot_3\sqrt{(Q/\Sigma\rho)} \quad (7)$$

Supposing that the ball having a diameter of 2 mm in bearing number B5-39 (inner diameter: 5 mm; outer diameter: 13 mm; width: 3 mm), which is a bearing for HDD, is made of ceramics, numerical values will be calculated as follows:

$d=2.0$ mm $r_i=1.07$ mm; $r_0=1.07$ mm;

$R_i=3.5$ mm; $R_0=5.50$ mm+$\delta_s$=5.508 mm (in which clearance $67_s$ is 16 $\mu$m)

By substituting these values for the equations (3) to (6) to calculate $\Sigma\rho$ and $\cos\tau$, the values of $\mu$, $v$, $\mu v$, and $2K/\pi\mu$ are then determined. The results are set forth in Table 1.

TABLE 1

| $\Sigma\rho$ | $\cos\tau$ | $\mu$ | $v$ | $\mu v$ | $2 K/\pi\mu$ |
|---|---|---|---|---|---|
| $\Sigma\rho_i$ = 1.351 | $\cos\tau_i$ = 0.903 | 3.14 | 0.457 | 1.44 | 0.675 |
| $\Sigma\rho_o$ = 0.884 | $\cos\tau_o$ = 0.903 | 2.62 | 0.505 | 1.32 | 0.742 |

When the maximum contact stress $\sigma_{max}$ and displacement amount (deformation amount) $\delta$ of the inner race and outer race are determined from the equations (1), (2) and (7), the following results are obtained:

For inner race, $$\left.\begin{array}{l}\sigma_{maxi}=1.78\times10^2\sqrt[3]{Q}\\ \delta_i=8.43\times10^{-4}\sqrt[3]{Q^2}\\ \text{For outer race,}\\ \sigma_{maxo}=1.47\times10^2\sqrt[3]{Q}\\ \delta_o=8.05\times10^{-4}\sqrt[3]{Q^2}\end{array}\right] \quad (8)$$

From the equation (8), the relationship $k\,_3\sqrt{Q}\,\sigma_{maxi}$ is established.

Referring next to the case where both the ball and the outer and inner races are made of steel, the maximum contact stress $\sigma_{max}$ and the displacement $\delta$ of steel ball are represented by the following equations:

$$\sigma_{max}=187\times(1/\mu v)_3\sqrt{\{\Sigma\rho\}^2 Q\}}$$

$$\delta=(1.28/10^3)(2K/\pi\mu)_3\sqrt{\{\Sigma\rho Q^2\}}$$

Therefore, the comparison of the load Q' and displacement $\delta_c'$ of steel ball with the load Q and approach $\delta_c$ of ceramics ball with respect to the same maximum contact stress $\sigma'_{maxi}$ gives the following results:

$$\left.\begin{array}{l}Q'=(210/187)^3 Q=1.41Q\\ \delta'_c=(1.28/1.13)\sqrt[3]{\{(Q'/Q)^2\delta_c\}}=1.42\,\delta_c\end{array}\right] \quad (9)$$

wherein $\delta_c=\delta_i+\delta_0$

It can be seen that the load Q' and displacement amount $\delta_c'$ of steel ball are each 1.4 times that of ceramics ball.

The load and displacement amount of ceramics ball and steel ball were determined with the value of $\sigma_{maxi}$ being 0.20, 0.39, 0.59, 0.78, 0.98, 1.18 and 1.37 GPa. The results are plotted in FIG. 10. In general, when an ordinary preload is added, the value of $\sigma_{max}$ is 0.98 GPa. At this time, the amount of elastic deformation (displacement amount) $\delta_c$ of the contact point of ceramics ball is as considerably small as 0.522 $\mu$m as determined from FIG. 10.

Ceramics ball and steel ball will be compared herein after in the effect of temperature difference on bearing preload.

The difference AA in linear thermal expansion coefficient between steel and ceramics is represented by the following equation:

$$\Delta A=11.8\times10^{-6}/°\,C.\,(\text{steel})-3.2\times10^{-6}/°\,C.\,(\text{ceramics})=8.6\times10^{-6}/°\,C.$$

The contact rigidity of ball with inner raceway surface is proportional to its maximum contact stress $\sigma_{maxi}$. When the amount $\delta_c$ of elastic deformation of the contact point is 0.2 $\mu$m or less, the value of contact rigidity shows a sudden drop. Supposing that the diameter of ball d is 2 mm, the calculation of temperature change $\Delta T$ corresponding to the difference $\Delta\delta_c$ of 0.2 $\mu$m in the amount of elastic deformation (displacement amount) between steel and ceramics gives the following results:

$$\Delta T=\Delta\delta_c/\Delta A\cdot\text{ball diameter}=0.2/(8.6\times10^{-6}\times2\times10^3)=11.6(°\,C.)$$

Accordingly, the elastic deformation $67_c=0.522$ $\mu$m of ceramics ball (see FIG. 10) at the foregoing general maximum contact stress $\sigma_{max}=0.98$ GPa corresponds to temperature difference of 30.3° C. In other words, when the temperature difference between during the predetermination of preload and during the use of bearing reaches 30.3° C., ceramics ball loses preload to reduce $\sigma_{max}$ to 0, causing the release of preload.

In case of the combination of ceramics ball and steel inner and outer races, there is a difference in linear thermal expansion coefficient therebetween. Therefore, the temperature difference $\Delta T$ causes an expansion difference of ball diameter d and inner and outer races, to thereby change a bearing clearance. The change $\Delta d$ is represented by the following equation:

$$\Delta d = \Delta A \times \Delta T \times d = 8.6 \times 10^{-6} \times \Delta T \times d \quad (10)$$

For example, when the maximum contact stress $\sigma_{maxi}$ is 0.98 GPa at d of 2 mm, the elastic deformation $\delta_c$ of ceramics ball is 0.52 $\mu$m.

Accordingly, (a) Supposing that the temperature during assembly is 20° C. and the working temperature is 80° C., $\Delta T$ is 60° C., giving the following change:

$$\Delta d = 8.6 \times 10^{-6} \times 60 \times 2.0 \times 10^3 \, \mu m = -1.032 \, \mu m$$

Since the condition under which the release of preload takes place is $\Delta = \delta_c + \Delta d < 0$, preload is released in this case.

(b) Supposing that the temperature during assembly is 60° C. and the working temperature is 80° C., $\Delta T$ is 20° C., giving the following change:

$$\Delta d = 8.6 \times 10^{-6} \times 20 \times 2.0 \times 10^3 \, \mu m = -0.344 \, \mu m$$

Since $\Delta$ is 0.18 $\mu$m, preload is not released. However, since the maximum contact stress $\sigma_{max}$ is approximately 0.59 Gpa, when the elastic deformation 67$_c$ of ceramics ball is about 0.18 $\mu$m as shown in FIG. 10, the rigidity is reduced by 40% from that at the initial $\sigma_{max}$ value (=0.98 GPa).

(c) Supposing that the temperature during assembly is 60° C. and the temperature during the transport of bearing is as low as 0° C. to 20° C., the temperature change $\Delta T$ is from −60° C. to −40° C., giving the following change $\Delta d$ of from 0.69 to 1.0 $\mu$m. Accordingly, $\Delta(=\delta_c+\Delta d)$ is from 1.21 to 1.52 $\mu$m, giving a tendency toward the rise in preload.

Supposing that $\Delta$ is 66 $_c$, the maximum contact stress $\sigma_{max}$ will be determined as follows:

From the equation (8), the amount of elastic deformation $\delta_c$ of ceramics ball is given by the following equation:

$$\delta_c = \delta_i + \delta_0 = (8.05 \times 10^{-4} + 8.43 \times 10^{-4})_3 \sqrt{Q^2} = 16.48 \times 10^{-4} Q^{2/3}$$

Accordingly, $$Q^{1/3} = \sqrt{(\delta_c \cdot 10^4/16.48)} = 24.633 \sqrt{\delta_c}$$

Similarly, from the equation (8), $$\sigma_{maxi} = 1.78 \times 10^2 \sqrt[3]{Q} \quad (11)$$
$$= 1.78 \times 10^2 \times 24.633 \sqrt{\delta_c} = 43.85 \times 10^2 \sqrt{\delta_c}$$

In other words, when $\delta_c$ is $1.21 \times 10^{-3}$ mm, $\sigma_{maxi}$ is 1.49 GPa, and when $\delta_c$ is $1.52 \times 10^{-3}$ mm, $\sigma_{maxi}$ is 1.68 GPa. Thus, when the temperature lowers from the value during assembly, preload rises, causing the maximum contact stress $\sigma_{maxi}$ to rise.

As can be seen in the foregoing calculation, when the difference in linear thermal expansion coefficient between ceramics and steel causes preload to rise or fall, the bearing working temperature exceeds the assembly temperature, causing the release of preload, or falls below the assembly temperature, causing a rise of preload. Thus, when the bearing rigidity changes, the natural frequency of HDD spindle motor, for example, changes to coincide with a specific frequency vibration generated by the combination of a large number of geometric. error components of the balls and rolling surfaces on the inner and outer races in ball bearing, increasing the possibility of resonance. Further, taking into account the change with time between the starting of rotation and the stabilization of temperature, resonance inevitably appears.

Further, since ceramics which are usually used in rolling bearing, such as silicon nitride, zirconia and alumina, are insulating materials, it is disadvantageous in that they electrostatically attract particles, giving an adverse effect on the acoustic properties of the device.

SUMMARY OF THE INVENTION

The present invention has been worked out paying attention to these problems of the related art. An object of the invention is to provide a ball bearing which can give solution to problems such as fretting wear, release of preload and deterioration of acoustic properties attributed to electrostaticity at the same time.

In order to accomplish the foregoing object of the invention, according to a first aspect of the invention, there is provided a rolling bearing comprising an inner race, an outer race and a plurality of rolling elements as constituents, characterized in that the inner race, outer race and rolling elements are made of a steel having a linear thermal expansion coefficient of from $10.1 \times 10^{-6}$ to $13.5 \times 10^{-6}$, both inclusive, and the steelball has a hard coating film having a thickness of from 0.5 $\mu$m to 2.5 $\mu$m, both inclusive, which is harder than the material of the rolling elements. Further, the hard coating film can be made of ceramic, an electrically-conductive ceramic, or a diamond-like carbon. Moreover, the base material of the rolling element is a martensite stainless steel. In addition, the hard coating film consists of an interlayer and a surface layers In addition, according to the invention, there is provided a bearing device comprising as constituents two or more bearings having an inner race fitted in an outer race apart from each other in the axial direction and a housing in which the bearing outer race is fitted, the bearing inner race and outer race being relatively rotatable via the rolling elements, a positioning preload being applied in the axial direction, characterized in that there is used the above rolling bearing. Further, according to the invention, the axial direction may be the direction of gravity.

In addition, according to the invention, there is provided a magnetic recording apparatus comprising the above bearing device, wherein said rolling bearing is made of an electrically-conductive ceramic.

According to a second aspect of the invention, the ball in a ball bearing is a steel ball having almost the same linear thermal expansion coefficient as that of the bearing race in the ball bearing, the metal ball being coated with a ceramics material. Examples of the metallic material constituting the ball and bearing ring include bearing steel such as SUJ2, case hardening steel such as SUS440C, 0.7C—13Cr martensite stainless steel and SCr(JIS), various alloy steels having secondary hardenability, high speed steel such as SKH(JIS) and special abrasion-resistant undeformable steel such as SKD(JIS). These steel materials have a linear thermal expansion coefficient of from $10.1 \times 10^{-6}$ to $13.5 \times 10^{-6}$/° C.

The ball in the ball bearing of the invention has a surface coating film made of ceramics and thus has a high surface hardness and mechanical strength and an excellent chemical stability and doesn't form any alloy when brought into contact with the bearing ring. Therefore, the ball in the ball bearing of the invention has the same fretting resistance as that of ceramics ball. Further, the main ball body is made of a metal such as steel and thus has the same linear thermal expansion coefficient as that of the inner and outer races. Thus, the main ball body undergoes no change in the maximum stress at the contact area with the rise in the temperature of the entire bearing. Accordingly, even when the temperature rises during use, any phenomenon such as drop of bearing rigidity and release of preload does not occur.

With respect to transient phenomenon with the temperature change, the ball of the invention has a smaller longitudinal elastic modulus and a greater thermal conductivity than ceramics ball to advantage.

Further, the rolling bearing according to the invention comprises rolling elements the rolling surface of which is made of an electrically-conductive ceramics. Accordingly, the rolling elements cannot be electrostatically charged and thus cannot attract particles, providing the bearing with excellent acoustic properties.

Moreover, in the rolling bearing according to the invention, at least one rolling surface of the rolling elements is formed by a low wear diamond-like carbon (hereinafter referred to as "DLC"). Thus, when used in HDD spindle motor or actuator, the rolling bearing according to the invention can be prevented from alloying with the race surface with which it comes in contact. Accordingly, the rolling surface of the rolling elements can be worn little, giving an excellent fretting resistance. At the same time, the rolling bearing according to the invention shows a prolonged life, a low torque and little torque variation under rotational and vibrational conditions during use.

BRIEF DESCRIPTION OF THE DRAWINGS

FIG. 8A and 8B are diagrams illustrating the main plane of curvature and the main radius of curvature on the point contact area of two curved surfaces wherein FIG. 8A is a perspective view and FIG. 8B is a sectional view;

DETAILED DESCRIPTION OF THE PREFERRED EMBODIMENTS

Embodiments of implication of the present invention will be described in connection with the attached drawings.

Embodiment 1

As the first embodiment of implication of the present invention there is used a surface-coated spherical body (ball) having a diameter of 2 mm to be used as rolling element for small diameter bearing B5-39 (inner diameter: 5 mm; outer diameter: 13 mm; width: 3 mm) produced by NSK, LTD.

Referring to the outline of the process for the formation of coating film on the ball, (1) A steel sphere having a diameter of 2 mm obtained by polishing a heat-treated steel material so that it has a precision which is to be accomplished shortly before final finish is coated with TiN at a predetermined temperature to a thickness of 0.2 to 3 $\mu$m by PVD process;

(2) Thereafter, the steel ball thus coated is hardened and tempered in a vacuum furnace so that the loss of hardness by the foregoing coating temperature is recovered;

(3) Subsequently, the steel ball thus treated is diamond-lapped until the coating thickness reaches a range of from 0.2 to 2.5 $\mu$m to remove deformation by heat treatment so that the surface roughness, waviness, roundness and dimensional accuracy thereof are adjusted to predetermined values.

The term "coating thickness" as used hereinafter is meant to indicate the thickness of the coating film thus treated. Therefore, the thickness of the coating film which has just been formed is occasionally somewhat greater than the foregoing value. When the foregoing dimensional precision fall within the predetermined ranges, the steel ball which has just been coated does not have to be treated before use.

The foregoing steps (1) to (3) are applied to the case where a steel ball as a work is subjected to PVD treatment at a temperature selected within a temperature range as relatively high as 200° C. to 600° C. to form a coating film having an enhanced strength. In the case where these steps are omitted to reduce the cost, the steel ball as a workpiece is subjected to PVD treatment at a temperature as low as 160° C., and then is subjected to the following step (3) with the step (2) being omitted.

In Embodiment 1, PVD treatment was effected at a temperature as low as 160° C.

(1) Example of PVD Treatment Step

Figure 1:
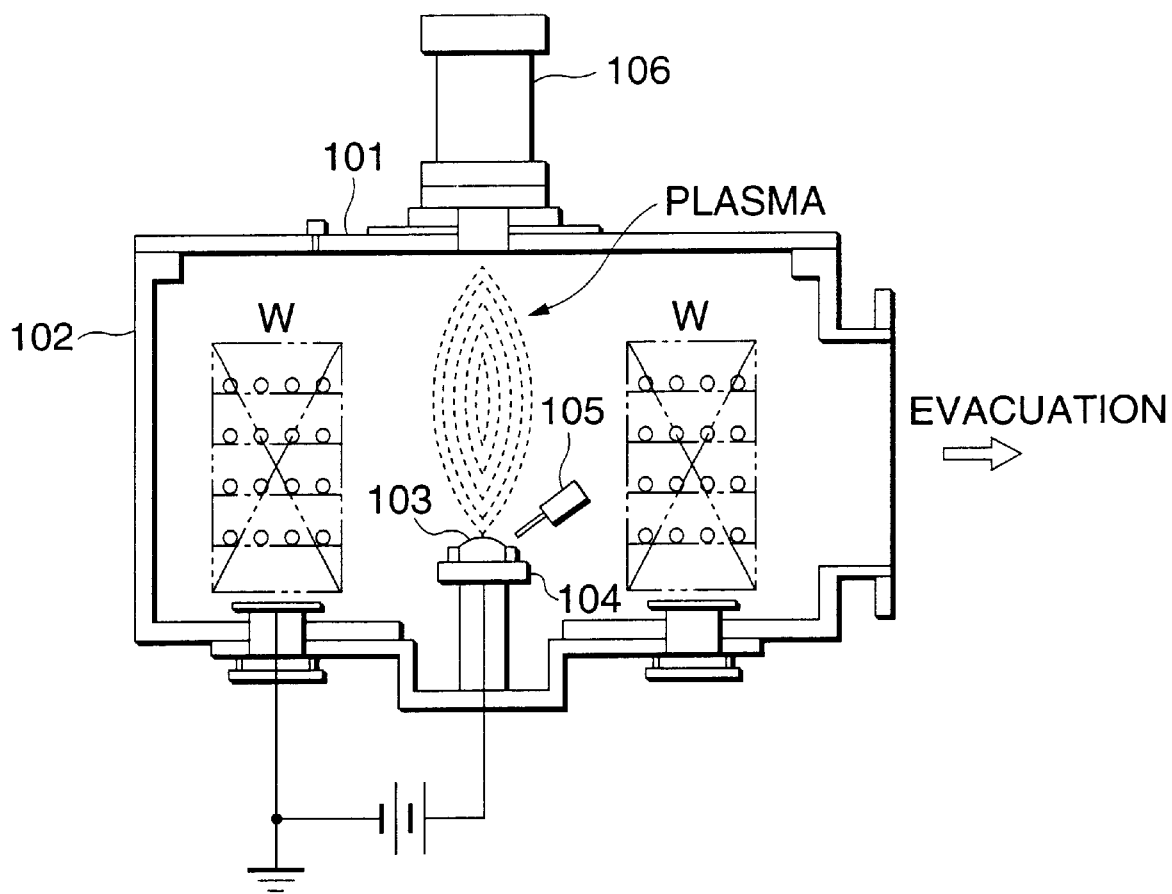
FIG. 1 is a schematic diagram illustrating a Physical Vapor Deposition (hereinafter referred as "PVD") apparatus of a Hollow Cathode Discharge (hereinafter referred as "HCD") process.

An HCD process PVD apparatus as shown in FIG. 1 is used. The upper cover 101 of the apparatus is opened, and a large number of steel balls W as workpieces are then placed in lines in a chamber 102.

(a) The air in the chamber is then evacuated to give a high vacuum ($10^{-5}$ to $10^{-13}$ Torr).

(b) Ti as a film-forming base metallic material 103 is then loaded in a crucible 104.

(c) The film-forming base metallic material 103 is then heated and melted by an electron beam gun 105 so that it is evaporated, (d) $N_2$ as a reaction gas is introduced into the chamber 2 with Ar as a carrier gas so that the pressure in the chamber is adjusted to a range of from $10^{-3}$ to $10^{-4}$ Torr.

(e) Glow discharge is allowed to take place across the clearance between a plasma electron gun 106 and the film-forming base metallic material 103 so that Ti is ionized to make a plasma that then forms a TiN film on the surface of the works W. This reaction is as follows:

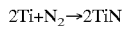

(In order to produce TiC, $C_2H_2$ can be introduced instead of $N_2$ to give the following reaction formula:

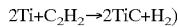

(f) During this procedure, the potential difference between the works W and the film-forming base metallic material 3 is predetermined to a range of from hundreds to thousands of voltage.

The thickness of the coating film is controlled by properly adjusting the coating time with the film-forming rate being previously predetermined accurately (to about several to scores of micrometer/hr). In Embodiment 1, the film-forming rate was from 0.5 to 1 μm/hr.

It is preferred that the works W be pre-heated to a temperature of 100° C. or higher. In the present embodiment, the temperature of the works W during PVD film forming was predetermined to 160° C. However, the treatment temperature may be properly predetermined to a range of from 200° C. to 600° C. As previously mentioned, in the case where steps are omitted to reduce the cost, low temperature film forming is preferred. In order to enhance the film strength, high temperature film forming is preferred.

(2) Fretting Evaluation Test

In case of a steel ball having a coating film to a thickness of 2.0 μm, which had been subjected to the foregoing low temperature PVD treatment, a surface-coated spherical body having a diameter of 2 mm was coated with a TiN film to a thickness of 2.5 μm. The surface-coated spherical body was subjected to diamond lapping until the thickness of the coating film reached 2.0 μm to adjust the dimensional accuracy. With these spherical bodies as rolling elements, four sets of ball bearing (bearing number B5-39) for HDD device spindle motor were assembled. These bearings as test specimens were then subjected to fretting durability test using a test device shown in FIG. 2. Fretting test was made for the various thicknesses up to 3.5 μm.

Figure 2:
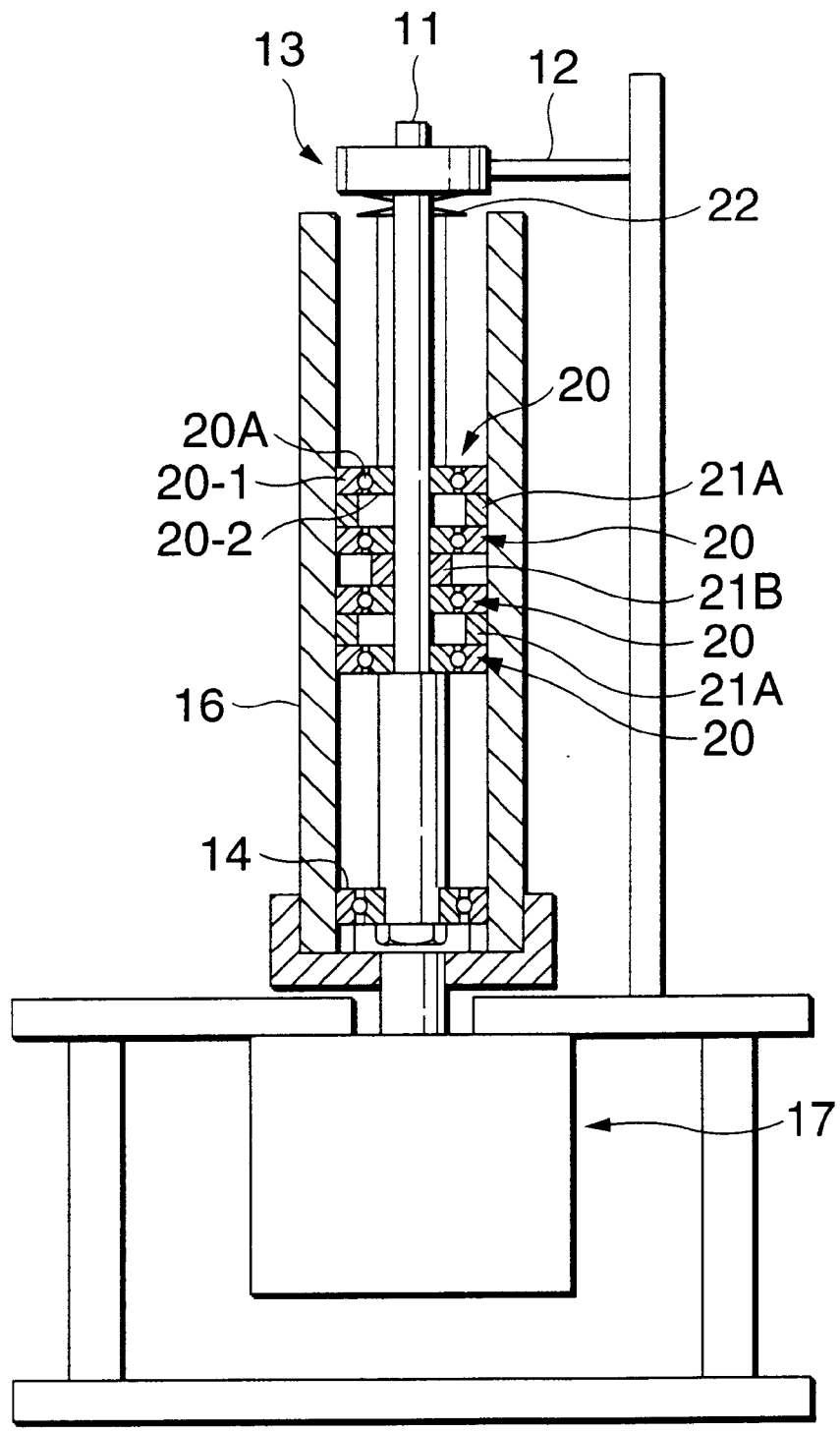
FIG. 2 is a schematic diagram illustrating a fretting evaluation testing machine.

In FIG. 2, the reference numeral 13 indicates a washer and a preload spring fixed to a shaft 11. The shaft 11 is fixed to a rotation stopper 12. A housing 16 supported by a support bearing 14 at the lower portion thereof is connected to an AC servo motor 17 and is vibrationally and rotatively driven at a predetermined angle by a predetermined number. The reference numeral 20 indicates four test bearings comprising the foregoing surface-coated spherical bodies incorporated therein as rolling elements 20A. The test bearings 20 each comprise its outer race 20-1 fitted in the interior of the housing 16, its inner race 20-2 through which the shaft 11 passes and sleeves 21A, 21B formed separately of the shaft 11 which are super imposed on each other. The shaft 11 and the inner race 20-2 do not rotate while the housing 16 and the outer race 20-1 are rotatably supported. The sleeves 21A, 21B are pressed in the axial direction by a coned disc spring 22 of the axial energization means 13 so that an axial load is applied to the inner race 20-2, outer race 20-1 and rolling elements 20A of the test bearing 20.

The test conditions were predetermined as follows:
Test bearing: B5-39
Oscillation frequency: 27 Hz
Oscillation angle: 2°
Axial load: 14.7 N
Number of oscillation: $1 \times 10^5$
Amount of grease: 12 mg (MULTEMP-SRL; produced by KYODO YUSHI)

The test was effected under the foregoing conditions. The four test bearings 20 were withdrawn to determine the acoustic value on the average. The value thus obtained was then arranged in connection with the relationship with the thickness of the coating film on the surface-coated spherical body as rolling element 20A.

(3) Results of Evaluation of Fretting Test

Figure 3:
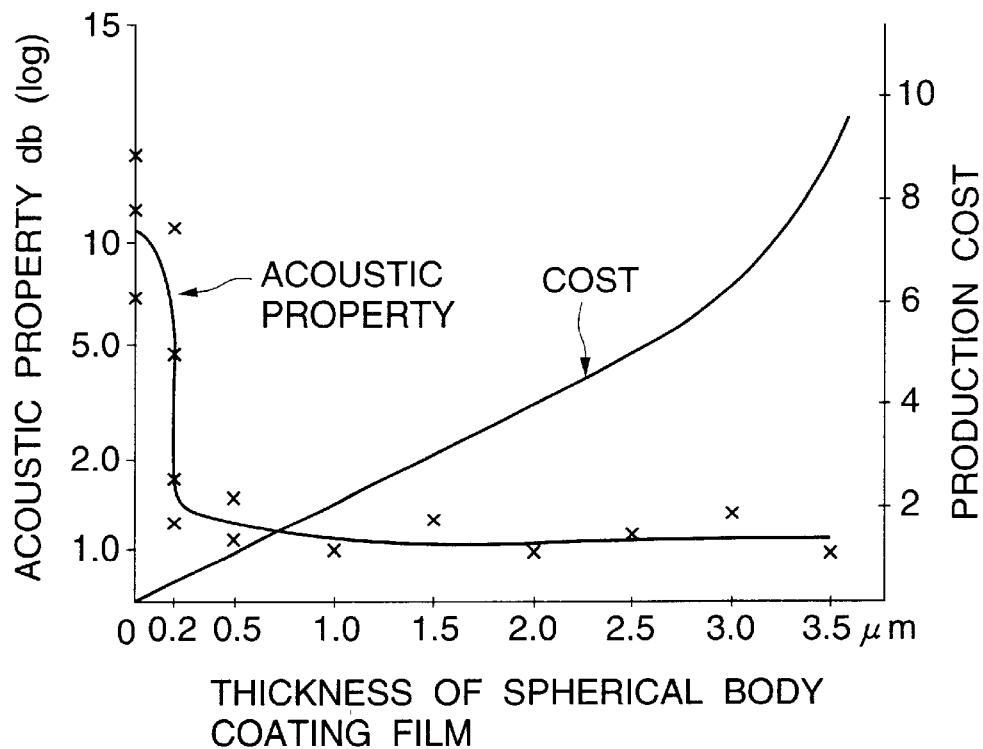
FIG. 3 is a graph illustrating the relationship between the thickness of the coating film on the spherical body and the acoustic properties before fretting test and the production cost.

FIG. 3 shows the relationship between the acoustic properties db (determined by a microphone sound pressure meter) before fretting test and the thickness of the coating film. By coating the rolling element with a ceramic coating film to a thickness of 0.2 μm or more, the rolling element can be prevented from alloying with the raceway surface with which it comes in contact, making it possible to have improved surface properties and hence improved acoustic properties.

Figure 4:
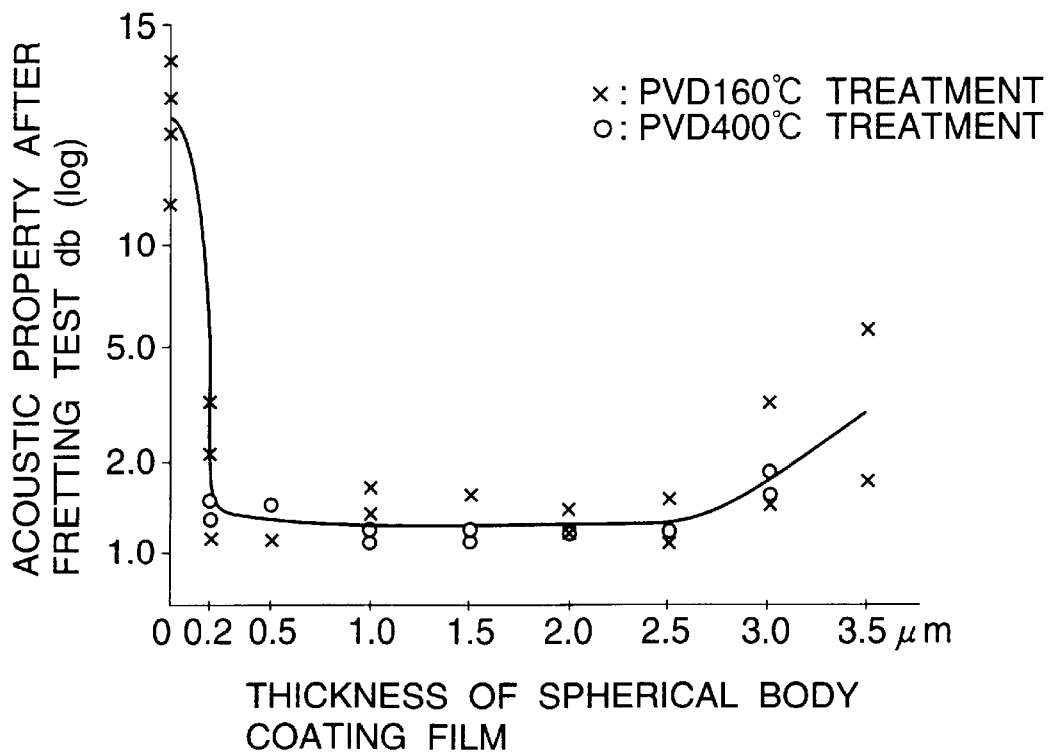
FIG. 4 is a graph illustrating the relationship between the thickness of the coating film on the spherical body and the acoustic properties after fretting test by PVD treatment temperature.

FIG. 4 shows the relationship between the acoustic properties db after fretting test and the thickness of the coating film.

In both FIGS. 3 and 4, the acoustic properties on the ordinate are represented relative to the sound pressure (db) of the test bearing (B5-39) coated with a coating film to a thickness of 2.0 μm before test as 1.0.

As shown in FIG. 3, when the thickness of the finished coating film on the diamond-lapped product falls below 0.2 μm, a film is ununiformly formed to give insufficient surface roughness, roundness and dimensional accuracy, causing variation and deterioration of acoustic properties. Referring to the relationship between the thickness of coating film and the cost, they are directly proportional to each other because they both are proportional to time. However, when the thickness of coating film goes beyond about 2.5 μm, this proportionality disappears, causing a slight drop of film-forming rate and hence a rise in the cost. Accordingly, the thickness of coating film on the surface-coated spherical body finished as a rolling element is preferably from 0.2 to 2.5 μm from the standpoint (of acoustic properties and cost.

It was confirmed that in the case where high temperature film-forming step at a processing temperature of 400° C. is selectively effected in PVD treatment for fretting evaluation test, TiN coating film formed on the surface of spherical body which has been hardened and tempered in vacuum thereafter, if it has an extremely large thickness, may undergo crack which is presumably attributed to heat. From this standpoint of view, too, it is necessary that the thickness of coating film be 3 μm or less and the thickness of coating film on the surface-coated spherical body finished as a rolling element be 2.5 μm or less. Further, from the standpoint of acoustic properties, the lower limit of the thickness of coating film is preferably 0.2 μm because the acoustic properties are stabilized when the thickness of coating film is 0.2 μm or more as shown in FIG. 3.

FIG. 4 shows the relationship between the acoustic properties db after fretting test and the thickness of coating film (mark x).

In the acoustic properties after oscillation test, too, when the thickness of coating film on the finished spherical body falls below 0.2 μm, the acoustic properties show a remarkable deterioration. Further, when the thickness of coating film exceeds 2.5 μm, the coating film partly undergoes damage by fatigue and peeling that deteriorates the coating film and hence the acoustic properties of bearing. From this standpoint of view, an excellent fretting resistance can be obtained when the thickness of coating film falls within the range of from 0.2 to 2.5 μm as in FIG. 3.

Embodiment 2

The second embodiment of implication of the present invention will be described with reference to the case where the steel ball having a diameter of 2 mm to be incorporated in the small diameter ball bearing B5-39 (inner diameter: 5 mm; outer diameter: 13 mm; width: 3 mm) produced by THE NSK, LTD. has been subjected to PVD treatment at 400° C. to form a TiN coating film thereon.

In PVD treatment of the present embodiment, a TiN coating film was formed to a thickness of 2.5 μm using an HCD process PVD apparatus shown in FIG. 1 under the same conditions as in Embodiment 1 except for the treatment temperature. Thus, the steel ball was subjected to PVD treatment at a temperature of as high as 400° C., which is higher than the tempering temperature at the preceding hardening and tempering step, and hence had a lowered hardness. The steel ball thus treated was heated to a temperature of 830° C. for 30 minutes in a vacuum oven, and then subjected to hardening and tempering to have a base material hardness HRC of from 60 to 63 (HV: 680 to 775). Thus, the hardness drop due to the foregoing coating temperature was recovered. The hardness HV of the coating film thus obtained was from 1,700 to 2,300, which is almost the same as that obtained in 160° C. treatment of Embodiment 1. Subsequently, the steel ball thus treated was diamond-lapped until the coating thickness reaches 2.0 μm so that the surface roughness, roundness and dimensional accuracy thereof are adjusted to predetermined values.

In the present embodiment, the test spherical ball which had been subjected to heat treatment showed a great deformation, adding to the working cost. However, since the adhesion between the film-forming material and the surface of the test spherical body is higher than that in the case of 160° C. treatment (Embodiment 1), the ball bearing of the present embodiment is advantageous in the life of acoustic properties under severe working conditions. FIG. 4 shows that when the thickness of coating film falls within the range of from 0.2 to 2.5 μm, the steel ball which has been subjected to PVD treatment at a temperature of as high as 400° C. (mark ○) shows a less variation of acoustic properties and little deterioration of acoustic properties than the steel ball which has been subjected to PVD treatment at a temperature of as low as 160° C. (mark x).

The foregoing various embodiments of implication of the invention have been described with reference to the case where the hard coating film is a TiN coating film, but the invention is not limited thereto. The invention can be applied to TiC coating film, AlN coating film, TiAlN coating film, ZrN coating film, HfN coating film, CrN coating film, TiCN coating film, WC coating film, diamond coating film, $Al_2O_3$ coating film, etc.

The foregoing various embodiments have also been described with reference to the case where the hard coating film is formed by PVD process. However, CVD process, too, is useful as film-forming process. The hardness of the coating film depends on the kind of the coating film and the film-forming process used, but falls within the HV range of from 1,000 to 3,000, which shows excellent surface properties. The linear thermal expansion coefficient of the coating film is almost the same as that of the base material of the rolling element (10.1 to $13.5 \times 10^{-6}$/° C.) because the thickness of the coating film is extremely smaller than the diameter of the ball. The representative values of the linear thermal expansion coefficient of steels are as follows.

Bearing steel SUJ2: $12.5 \times 10^{-6}$/° C.

Martensitic stainless steel: $10.1 \times 10^{-6}$/° C.

0.7–13 Cr stainless steel: $11.1 \times 10^{-6}$/° C.

Abrasion-resistant undeformable special steel SKD11: $12 \times 10^{-6}$/° C.

High speed steel SKH4: $12 \times 10^{-6}$/° C.

Case hardening steel: $13.5 \times 10^{-6}$/° C.

Referring to the base material of the surface-coated spherical body, various hard metals having secondary hardenability, high speed steel such as SKH, abrasion-resistant undeformable special steel such as SKD, martensitic stainless steel such as SUS440C, etc. undergo no hardness drop even after high temperature treatment during film forming and thus do not need to be hardened and tempered during film forming.

Further, by forming the spherical body to a high precision before PVD treatment, diamond lapping to be effected after film forming can be omitted.

Moreover, diamond lapping may be replaced by the use of abrasive grain such as CBN and SiC.

Even when the diameter d of the steel ball is further reduced to, e.g., 1/16 inch (1.588 1.20 mm), the ratio of diameter and $δ_c$ to that of 2 mm diameter ball are 0.794 and 0.809, respectively. Accordingly, the resulting maximum contact stress (preload change) is almost the same as that of 2 mm diameter ball.

Embodiment 3

The third embodiment of implication of the invention will be described with reference to the case where a rolling element made of steel or the like for HDD ball bearing (bearing number R168; inner diameter: 6.35 mm; outer diameter: 9.525 mm; width: 3.175 mm; thirteen rolling elements: 1.0 mm in diameter) has an electrically-conductive ceramics layer formed on its rolling surface.

Preferred examples of electrically-conductive ceramics employable herein include TiN, TICN, TiC, CrN, TiAlN and WC. These electrically-conductive ceramics may be used singly or in combination of two or more thereof. When these electrically-conductive ceramics are used in combination of two or more thereof, two or more of these electrically-conductive ceramics layers are laminated to form an electrically-conductive ceramics layer.

Examples of the method for forming the foregoing electrically-conductive ceramics layer include ion-plating method, plasma Chemical Vapor Deposition (hereinafter referred as "CVD"), thermal CVD, and sputtering method. The hardness of the coating film depends on the kind of the coating film and the film-forming process used but falls within the HV range of from 1,000 to 3,000, which shows excellent surface properties. The linear thermal expansion coefficient of the coating film. is almost the same as that of the base material of the rolling element (10.1 to $13.5 \times 10^{-6}$/° C.) because the thickness of the. coating film is extremely smaller than the diameter of the ball.

In the rolling bearing of the invention, an interlayer made of Ti, Cr, Si and compounds thereof may be provided between the foregoing electrically-conductive ceramics layer and the base material of the foregoing rolling bearing to enhance the adhesion between the foregoing electrically-conductive ceramics layer and the base material of the rolling bearing.

As the method for forming the interlayer there may be used the same method as used in the formation of the foregoing electrically-conductive ceramics layer, such as ion-plating method, plasma CVD, thermal CVD and sputtering method.

The electrical conductivity of electrically-conductive ceramics which can be preferably used in the invention are set forth in Table 2. The electrical conductivity of SUJ2, which is a metal, and insulating ceramics used in the conventional rolling bearing are set forth in Table 2, too.

TABLE 2

| | |
|---|---|
| TiN | $2.2 \times 10^{-5}$ Ωcm |
| TiCN | $5.0 \times 10^{-5}$ Ωcm |
| TiC | $8.5 \times 10^{-5}$ Ωcm |
| CrN | $2.2 \times 10^{-5}$ Ωcm |
| SUJ2 | $10^{-5}$ Ωcm |
| SiC | $10^{10}$ to $10^{13}$ Ωcm |
| $Al_2O_3$ | $10^{14}$ Ωcm or more |
| AlN | $10^{11}$ to $10^{14}$ Ωcm |

In the present embodiment, a TiCN coating film (interlayer) of a thickness of 0.5 μm and a TiC coating film (electrically-conductive ceramics layer) of a thickness of 2 μm were formed on the surface of the rolling element 4, respectively, by ion-plating method using the apparatus of FIG. 1.

In some detail, the pressure in the apparatus was reduced to $10^{-5}$ Torr or less. The workpiece (rolling element 4) was then heated to a temperature of from 300° C. to 400° C. for 2 to 4 hours. Thereafter, into the apparatus were introduced methane gas ($CH_4$) and nitrogen gas ($N_2$) while Ti was being evaporated from a Ti evaporation source by arc discharge. Then, TiCN was produced in plasma so that the rolling element 4 was coated with TiCN. When the rolling element 4 was coated with TiCN to a predetermined thickness and the introduction of nitrogen gas was then suspended, TiC was produced in plasma so that the rolling element 4 was coated with TiC.

The same layer as above can be formed also by plasma CVD method. In this case, TiCN is produced in plasma according to the following reaction formula. When the introduction of nitrogen gas is suspended, TiC is produced.

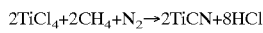

$$2TiCl_4 + 2CH_4 + N_2 \rightarrow 2TiCN + 8HCl$$

The results of various bearing performance tests made on the rolling bearing of the present embodiment will be described hereinafter.

The kind of the base material of the rolling element, the kind of ceramics used to coat the rolling element and the thickness (μm) of the coating film are set forth in Table 4.

The term "TiCN+TiC" as set forth in the column of kind of ceramics in Table 4 means that TiCN is an interlayer and TiC is an electrically-conductive ceramics layer.

The thickness of the electrically-conductive ceramics layer is from 0.2 to 2.5 μm if the coating film is made of electrically-conductive ceramics layer alone. If the coating film is made of electrically-conductive layer and interlayer, the thickness of the electrically-conductive ceramics layer is from 0.2 to 2.5 μm, including that of the interlayer which is from 0.1 to 0.3 μm.

As the rolling bearing of examples and comparative examples there was used a Type R168 small diameter ball bearing (inner diameter: 6.35 mm; outer diameter: 9.525 mm; width: 3.175 mm; thirteen rolling elements: 1.0 mm in diameter) produced by THE NSK, LTD. Referring to the material of the ball bearing, the inner and outer races are made of SUJ2 (hardness after hardening and tempering: HRC 60–62 (HV 700–750)) and the rolling element is made of SUS440C (hardness after hardening and tempering.: HRC 58–60 (HV 650–700)). When the surface of the rolling element is coated with an electrically-conductive conductive ceramics by ion-plating method, CVD or the like, the temperature of the rolling element rises. Therefore, high Cr SUS440C having a high tempering resistance was used. The hardness of the coating film thus obtained fell within the HV range of from 1,700 to 2,300.

SUJ2 used in the rolling element of the comparative examples was the same as that used in the foregoing inner and outer races.

The method for forming the foregoing ceramics layer in the rolling bearing of the present embodiment is the same as in the foregoing rolling bearing 1.

The reaction conditions under which various electrically-conductive ceramics layers and interlayers are formed by ion-plating method or CVD method (evaporation source, reaction gas) are set forth in Table 3.

WC layer is formed by sputtering WC.

TABLE 3

| Layer | Evaporation source | Reaction gas |
|---|---|---|
| TiN | Ti | $N_2$ |
| TiCN | Ti | $N_2 + CH_4$ |
| CrN | Cr | $N_2$ |
| Cr | Cr | — |
| TiAlN | Al, Ti | $N_2$ |
| TiC | Ti | $CH_4$ |

The method and conditions for testing the performance of rolling bearing were as follows:

(1) Stillness

Measurement of stillness was effected in medium band (M.B.) and high band (H.B.) using an andelon meter 20 times for each band. The measurements were then averaged. These values were represented relative to that of Comparative Example 1. as 1.

(2) Fretting Resistance

The rolling bearing was mounted on a fretting resistance testing machine shown in FIG. 2. The rolling bearing (n=4) was then operated under the following conditions. The rolling bearing was then measured for stillness in M.B. and H.B. using an andelon meter. For each of the rolling bearings, the measurements were each represented relative to that determined before operation as 1 (degree of stillness deterioration after operation was evaluated).

Test Conditions

Test bearing: R168

Oscillation frequency: 30 Hz

Oscillation angle: 8°

Axial load: 14.7 N

Number of Oscillation: $1 \times 10^5$

The test results are set forth in Table 4. In all the examples, the rolling bearing exhibited an excellent stillness and remarkably excellent fretting resistance as compared with that of the conventional rolling bearings of Comparative Examples 1 and 2. This is because the coating of the surface of the rolling element with an electrically-conductive ceramics makes it possible to prevent the rolling element from alloying with the race surface with which it comes in contact, and provide the rolling element with excellent surface properties.

The rolling bearings of Comparative Examples 3 to 5, which fall outside the range of the thickness of coating film of the invention, were far inferior to all the examples in both stillness and fretting resistance. This corresponds to the fact that when the thickness of the coating film falls below 0.2 μm, a coating film is ununiformly formed, and when the thickness of the coating film is extremely great, cracking which is presumably attributed to heat takes place, deteriorating performance, as shown in FIGS. 3 and 4. Referring to the relationship between the thickness of the coating film on the spherical body and the acoustic properties, Embodiment 3 shows almost the same tendency as in FIGS. 3 and 4.

Accordingly, the thickness of the coating film is preferably from 0.2 to 2.5 μm.

Thus, the rolling bearings of the present embodiment comprise rolling elements the rolling surface of which are coated with an electrically-conductive ceramics to a thickness of from 0.2 μm to 2.5 μm, both inclusive, and hence exhibit remarkably excellent fretting resistance and acoustic properties.

Accordingly, the thickness of the electrically-conductive ceramics layer is preferably from 0.2 to 2.5 μm. When the thickness of the electrically-conductive ceramics layer falls below 0.2 μm, the thickness of the ceramics layer can hardly be controlled and thus can be varied, making it difficult to obtain a rolling bearing having stabilized fretting resistance and wear resistance. On the contrary, when the thickness of the electrically-conductive ceramics layer exceeds 2.5 μm, the desired effect can-be obtained no longer. Further, when the thickness of the electrically-conductive ceramics layer is too much, the ceramics layer exhibits raised distortion that can cause peeling. Moreover, it takes much time to form the electrically-conductive ceramics layer, adding to cost.

TABLE 4

| | Base material | Rolling element Ceramics | Coating film thickness (μm) | Stillness M. B. | Stillness H. B. | Fretting resistance M. B. | Fretting resistance H. B. |
|---|---|---|---|---|---|---|---|
| Example 1 | SUS440C | TiN | 1.8 | 1.0 | 1.0 | 1.3 | 1.5 |
| Example 2 | SUS440C | TiCN | 0.6 | 1.0 | 1.0 | 1.3 | 1.4 |
| Example 3 | SUS440C | TiC | 2.5 | 1.0 | 1.0 | 1.2 | 1.3 |
| Example 4 | SUS440C | WC | 0.2 | 1.0 | 1.0 | 1.2 | 1.4 |
| Example 5 | SUS440C | CrN | 1.2 | 1.0 | 1.0 | 1.2 | 1.3 |
| Example 6 | SUS440C | TiAlN | 0.2 + 1.9 | 1.0 | 1.0 | 1.4 | 1.5 |
| Example 7 | SUS440C | TiCN + TiC | 0.1 + 0.6 | 1.0 | 1.0 | 1.3 | 1.4 |
| Example 8 | SUS440C | Ti + TiC | 0.1 + 2.3 | 1.0 | 1.0 | 1.2 | 1.4 |
| Example 9 | SUS440C | Cr + WC | 0.3 + 1.5 | 1.0 | 1.0 | 1.3 | 1.4 |
| Example 10 | SUS440C | Cr + CrN | 0.2 + 2.0 | 1.0 | 1.0 | 1.2 | 1.3 |
| Comparative Example 1 | SUS440C | — | — | 1.0 | 1.0 | 1.9 | 2.2 |
| Comparative Example 2 | SUJ2 | — | — | 1.0 | 1.0 | 1.7 | 2.0 |
| Comparative Example 3 | SUS440C | TiN | 15 | 2.0 | 2.2 | 10.5 | 7.5 |
| Comparative Example 4 | SUS440C | TiCN | 0.15 | 1.3 | 1.6 | 3.0 | 5.0 |
| Comparative Example 5 | SUS440C | TiC | 0.1 | 1.2 | 2.3 | 4.5 | 3.0 |

When the foregoing electrically-conductive ceramics layer is formed by laminating two or more electrically-conductive ceramics layers, the total thickness of all the laminated layers is preferably from 0.2 to 2.5 μm for the same reason as mentioned above.

In the rolling bearing of the invention, an interlayer made of Ti, Cr, Si and compounds thereof may be provided between the foregoing electrically-conductive ceramics layer and the base material of the foregoing rolling bearing to enhance the adhesion between the foregoing electrically-conductive ceramics layer and the base material of the rolling bearing. For example, when the base material of the foregoing rolling element is SUS440C, which exhibits a higher affinity for Cr, an interlayer of Cr can be provided to enhance the adhesion between the foregoing electrically-conductive ceramics layer and the foregoing base material.

In the case where the foregoing interlayer is provided, its thickness is preferably from 0.1 to 0.3 μm and the total thickness of the foregoing interlayer and the foregoing electrically-conductive ceramics layer is preferably from 0.2 to 2.5 μm. When the thickness of the interlayer falls below 0.1 μm, the thickness of the interlayer can hardly be controlled, making it difficult to form a layer having a uniform thickness. On the contrary, when the thickness of the interlayer exceeds 0.3 μm, the resulting interlayer exhibits raised distortion that can cause peeling. The reason why the total thickness of the foregoing interlayer and the foregoing electrically-conductive ceramics layer falls within the above defined range is the same as described with reference to the case of electrically-conductive ceramics layer.

As the material (base material) constituting the rolling bearing of the invention there is often used a metallic material such as bearing steel. Examples of such a metallic material include SUJ2, SUS440C, 0.7C—13Cr stainless steel, M50 and carburizing steel described in JIS G 4805. Ordinary steel materials to be used in bearing may be used.

The inner and outer races of the rolling bearing of the invention are made of the same material as that of the rolling element. However, the rolling bearing is often fixed to the housing or shaft with an adhesive. Therefore, when an oil content such as rust preventive oil is attached to the exterior of the shaft, the adhesive strength lowers, or the rust preventive oil undergoes chemical reaction with the shaft to cause rust. Further, when the rolling bearing is used in apparatus such as HDD, outgassing takes place, lowering the reliability of the apparatus (in the case of HDD, for example, the gas thus produced contaminates the surface of magnetic disc) Accordingly, the rolling bearing is often completely degreased. As a countermeasure against this trouble, the inner and outer races are preferably made of stainless steel, which requires no rust preventive oil or the like.

When the base material of the rolling element for the rolling bearing of the invention is steel as mentioned above, the elastic modulus and linear thermal expansion coefficient (10.1 to 13.5×10$^{-6}$/° C.) are almost the same as that of the rolling element for the conventional bearing which is made of steel alone. Accordingly, a rolling bearing can be obtained which exhibits an excellent impact load resistance, undergoes no release of preload and shows no rigidity drop when the temperature rises during the operation of the apparatus and is electrostatically charged little enough to prevent the attraction of particles and hence provide excellent acoustic properties. The bearing of the invention has an electrical conductivity due to the constitution of the inner, outer race and rolling elements and thus can perform even fairly as a rolling bearing for office machines which are susceptible to electrostaticity such as HDD, VTR and printer.

Embodiment 4

The fourth embodiment of implication of the invention will be described with reference to the case where the rolling surface of a rolling element made of steel ball for ball bearing for HDD (SR1810) is made of diamond-like carbon (hereinafter referred to as "DLC") and the thickness of the coating film is from 0.2 to 2.5 μm.

Examples of the method for forming a DLC layer on the rolling surface of rolling element made of steel or the like include plasma CVD with a hydrocarbon gas such as methane ($CH_4$), acetylene ($C_2H_2$) and benzene ($C_6H_6$) using the apparatus shown in FIG. 1, ion-plating method, and sputtering method with carbon as a target. In some detail, rolling bearing components which have been degreased is placed in a vacuum chamber in which the air within is then evacuated to 10$^{-3}$ Pa. The rolling bearing components are then subjected to ion bombardment so that the surface thereof are cleaned. A DLC layer is then formed on the surface of the components according to the foregoing method.

The thickness of DLC layer constituting the foregoing rolling surface is preferably from 0.2 to 2.5 μm. When the thickness of DLC layer falls below 0.2 μm, the resulting lubricating effect is insufficient. On the contrary, when the thickness of DLC exceeds 2.5 μm, it adds to cost. Further, the resulting internal stress can cause DLC to be peeled. Embodiment 4, too, shows almost the same tendency for the relationship between the thickness of coating film on the spherical body and the acoustic properties as in the case where the ball is coated with ceramics as shown in FIGS. 3 and 4. Accordingly, the thickness of the coating film is preferably from 0.2 to 2.5 μm.

In the rolling bearing of the invention, an interlayer made of Si, SiC, SiO2, Si3N4, WC, Cr, Ti or combination thereof is preferably provided between the DLC layer and the base material made of steel to enhance the adhesion between the DLC layer and the base material of the rolling bearing.

The thickness of the foregoing interlayer is preferably from 0.1 to 0.3 μm. When the thickness of the interlayer falls below 0.1 μm, the thickness of the interlayer can be hardly controlled. When the thickness of the interlayer exceeds 0.3 μm, the resulting internal stress can cause the interlayer to be peeled. A plurality of interlayers may be provided in combination.

As the method for forming the foregoing interlayer there maybe used the same method as used in the formation of DLC layer, such as plasma CVD, ion-plating method and sputtering method. In some detail, the surface of rolling bearing components are cleaned similarly to the case of DLC layer. Thereafter, the rolling bearing components are subjected to plasma CVD or the like with silane ($SiH_4$) and a hydrocarbon gas, or tetramethylsilane ($Si(CH_3)_4$) as a starting material to form an interlayer of SiC or the like thereon. A DLC layer is then formed on the interlayer according to the method as mentioned above.

In the present embodiment, the inner race, the outer race and the rolling element are made of SUS440C. The rolling element has an SiC layer having a thickness of 0.1 μm and a DLC. layer having a thickness of 1 μm formed on the surface thereof by plasma CVD method (SiC layer is an interlayer and DLC layer is a surface layer).

The results of various performance tests made on the rolling bearing of the present embodiment will be described hereinafter.

As the rolling bearing of the examples and comparative examples there was used a single row deep groove ball bearing produced by THE NSK, LTD. (non-contact steel seal (Z type); Bearing No. SR1810; inner diameter: 7.94 mm; outer diameter: 12.7 mm; width: 3.97 mm; Bearing No. B5-39; inner diameter: 5 mm; outer diameter: 13 mm; width: 3 mm). The base material of the inner race, the outer race and the rolling element is SUS440C, and the hardness HRC of the steel material which has been hardened and tempered is from 58 to 60 (HV 650 to 700). The cage is made of a glass fiber-reinforced polyamide resin if it is crown-shaped or made of an austenite stainless steel SUS304 if it is a pressed product.

The testing method, testing conditions and criterion of test results were as follows.

(1) Oscillation Resistance Test

For the judgment of oscillation resistance, the rolling bearing (n=4) was subjected to vibration resistance test using a fretting resistance testing machine shown in FIG. 2 under the following conditions. The bearing was then disassembled to check the inner race surface, the outer race surface and the rolling surface of the rolling elements for abrasion. Those showing no abrasion on all the components were judged as acceptable (○). Those showing running mark on the inner race surface or outer race surface were judged as fair (Δ). Those showing abrasion on any of the inner race surface, the outer race surface and the rolling surface of the rolling elements were judged as unacceptable (x).

Testing Conditions

Test bearing: SR1810

Oscillation angle: 8°

Axial load: 29.4 N

Number of oscillation: $5 \times 10^6$

Temperature of atmosphere: Room temperature (2) Dust Generation Test

Figure 5:
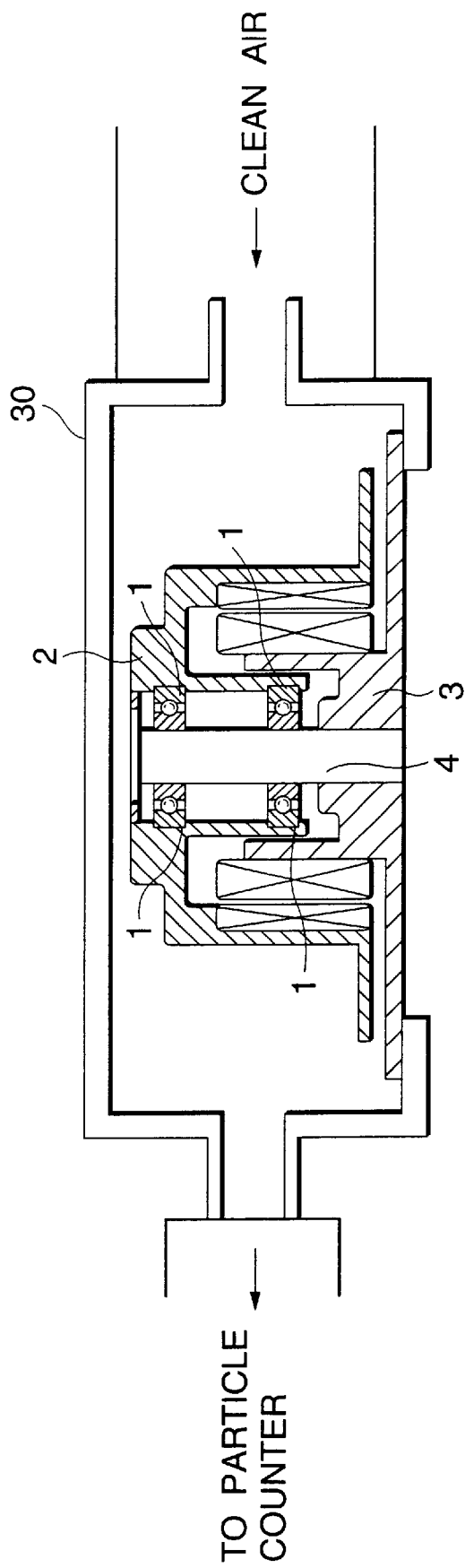
FIG. 5 is a schematic diagram showing a spindle motor of dust generation test.

As shown in FIG. 5, an HDD spindle unit having two ball bearings B5-39 supported thereon by in-place preload process was mounted in a vessel which was then sealed. The outer race was then rotated at 7,200 rpm. The number of dust particles generated during this procedure was then measured by means of an out particle counter to determine the generated amount of dust. For the judgment of generated amount of dust, the number of dust particles having a particle diameter of 0.1 μm or more per 0.1 cf (cubic feet) was counted after 1 hour of rotation.

Referring to criterion, those showing less than 150 dust particles were judged as acceptable (○). Those showing from 150 dust particles to less than 300 dust particles were judged as fair (Δ). Those showing 300 or more dust particles were judged as unacceptable (x).

(3) Torque Test

For the judgment of torque, the inner race was rotated at 2 rpm by a rotary device under an axial load of 9.8 N. The torque required in the first stage of rotation and torque change were then measured.

Referring to criterion, those showing a torque of less than 1.0 gf.cm required for the rotation of inner race and a torque change of less than 0.2 gf.cm were judged as acceptable (○). Those showing not less than the above value for either of the two properties were judged as unacceptable (x).

The material of the inner race, the outer race and the rolling surface of the rolling element and the type of the cage are as set forth in Table 5. In Table 5, DLC(1) means that the material is coated with DLC of 1 μm, and SiC(0.1)+DLC(1) means that the interlayer made of SiC of 0.1 μm is coated with DLC layer of 1 μm. The hardness of the coating film thus obtained fell within the HV range of from 2,000 to 5,000.

The lubricant used in the lubricated case in Table 5 is a Type S-100 fluorine-based oil produced by DAIKIN INDUSTRIES, LTD.

The test results are set forth in Table 6. All the examples were acceptable for all the three tests. This is because the coating of the surface of the rolling element with DLC prevents the rolling element from alloying with the race surface with which it comes in contact, making it possible to exhibit excellent surface properties. On the contrary, all the comparative rolling bearings which fall outside the range of the invention were unacceptable for at least one of the three tests. Embodiment 4 is characterized in that the lubricating effect of DLC coating film makes it possible to meet all the requirements for durability, prevention of dust generation and reduction of required torque without using lubricant.

TABLE 5

|  | Coating of Rolling element | Type of Cage | Lubricant |
|---|---|---|---|
| Example 11 | SiC (0.1) + DLC (1) | Crown-shaped | None |
| Example 12 | SiC (0.3) + DLC (1) | Crown-shaped | None |
| Example 13 | SiC (0.1) + DLC (1) | Pressed | None |
| Example 14 | SiC (0.1) + DLC (1) | Crown-shaped | Used |
| Example 15 | DLC (1) | Crown-shaped | None |
| Example 16 | Ti (0.1) + Si (0.1) + DLC (1) | Crown-shaped | None |
| Example 17 | Cr (0.1) + WC (0.2) + DLC (1) | Crown-shaped | None |
| Comparative Example 11 | — | Crown-shaped | Used |
| Comparative Example 12 | SiC (0.05) + DLC (0.1) | Crown-shaped | None |
| Comparative Example 13 | DLC (2.5) | Crown-shaped | None |

TABLE 6

|  | Vibration resistance test | Dust generation test | Torque test |
|---|---|---|---|
| Example 11 | ◯ | ◯ | ◯ |
| Example 12 | ◯ | ◯ | ◯ |
| Example 13 | ◯ | ◯ | ◯ |
| Example 14 | ◯ | ◯ | ◯ |
| Example 15 | Δ | Δ | ◯ |
| Example 16 | ◯ | ◯ | ◯ |
| Example 17 | ◯ | ◯ | ◯ |
| Comparative Example 11 | X | ◯ | X |
| Comparative Example 12 | X | Δ | ◯ |
| Comparative Example 13 | X | X | X |

The rolling bearing of the invention doesn't necessarily require a lubricant because of the lubricating properties of DLC coating film. However, a slight amount of a lubricant may be injected into the interior of the bearing. As the lubricant to be used there may be used a fluorine-based oil or the like.

In the case where such a lubricant is used, even if the drag of the rolling elements causes the lubricant to be scratched off from the area on which the race on the inner and outer races and the rolling elements come in contact with each other, i.e., rolling surface, the rolling surface cannot be worn or damaged because the rolling surface is formed by DLC. Thus, the rolling bearing of the invention is provided with an enhanced durability.

In this case, since the rolling surface of the rolling elements is formed by DLC and a lubricant is injected into the interior of the bearing, the lubricant cannot be attached to the exterior of the bearing, preventing the exterior of the bearing from being sticky. Therefore, it is not necessary to wipe lubricant from the bearing before mounting the rolling bearing having an outer race bonded thereto on HDD spindle unit and swing arm unit, making it possible to raise the productivity of rolling bearing and reduce the cost. Further, since no lubricant is attached to the exterior of the bearing, it is not likely that the recording medium in HDD can be contaminated by lubricant.

The method for injecting the lubricant into the interior of the bearing is not specifically limited so far as it allows control over the injected amount of lubricant. For example, a method may be employed which comprises previously fitting a sealing plate in the lower portion of the bearing, and then uniformly injecting a lubricant into the interior of the bearing at the top of the bearing through nozzles which have been uniformly projected from the top of the bearing by the number equal to the number of bearing cage pockets. Another method comprises injecting a lubricant by a predetermined amount through a quantitative injector.

The material of the inner race, the outer race and the rolling elements of the rolling bearing of the invention are not limited to SUS440C as used in the foregoing embodiments but may be a bearing steel such as high carbon-chromium bearing steel (e.g., SUJ2). In the case where corrosion resistance is required, martensite stainless steel such as SUS440C and 0.7C—13C stainless steel, precipitation hardening stainless steel such as SUS630 or the like is preferred. The rolling element may be formed by various hard metals having secondary hardenability, high speed steel such as SKH or special abrasion resistant undeformable steel such as SKD. The hardness of the coating film varies with the kind of the coating film and the coating method. When the hardness NV ranges from 1,000 to 10,000, excellent surface properties are given. The linear thermal expansion coefficient of the coating film is almost the same as that of the base material of the rolling element made of steel because the thickness of the coating film is extremely smaller than the diameter of the steel ball.

The cage for the rolling elements constituting the rolling bearing of the invention is formed by a synthetic resin material besides a soft steel such as SPCC material. As such a synthetic resin material there may be used an ordinary polyamide resin (nylon 66) as well as fluororesin such as heat-resistant thermoplastic resin PTFE and ETFE, polyether ether ketone (PEEK), polyphenylene sulfide (PPS), polyether sulfone (PES), engineering plastic such as nylon 46 or the like. Examples of the type of cage include wavy type and crown-shaped cages.

The present invention is effective particularly when a load is applied to a vertical motor as in the spindle bearing for magnetic disc drive device, i.e., when the weight of a rotary unit acts as a thrust load by its gravity to make the axial load greater than the radial load.

Figure 6:
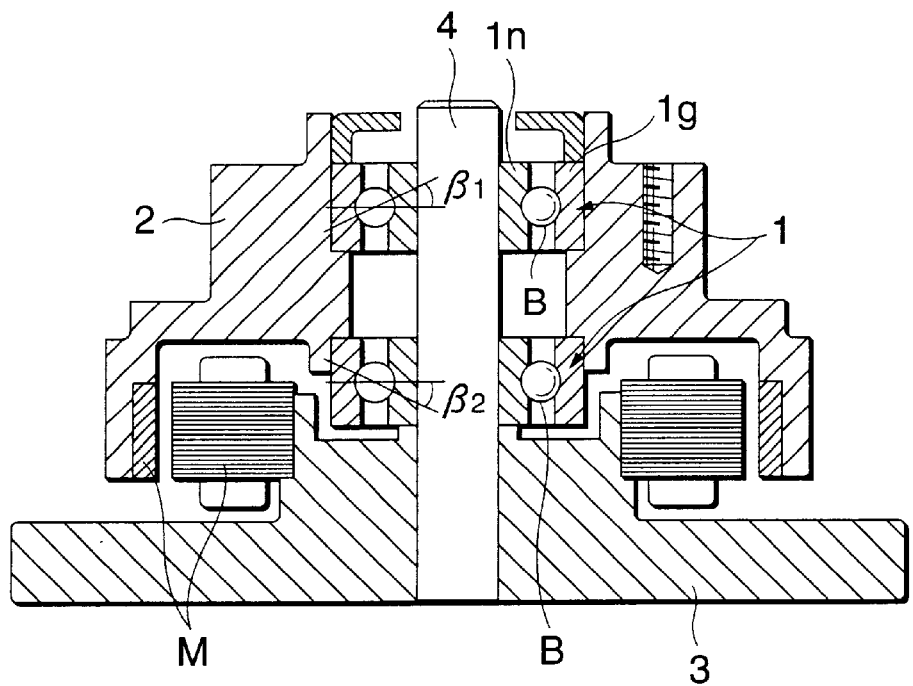
FIG. 6 is a sectional view illustrating an HDD spindle motor.
Figure 7:
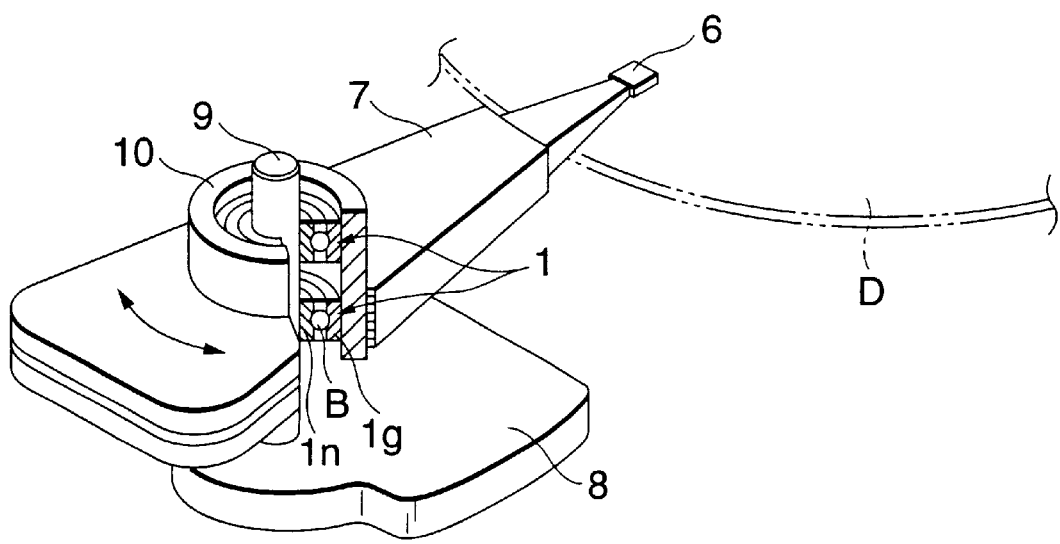
FIG. 7 is a partially cutaway perspective view of an HDD swing arm motor.
Figure 8A:
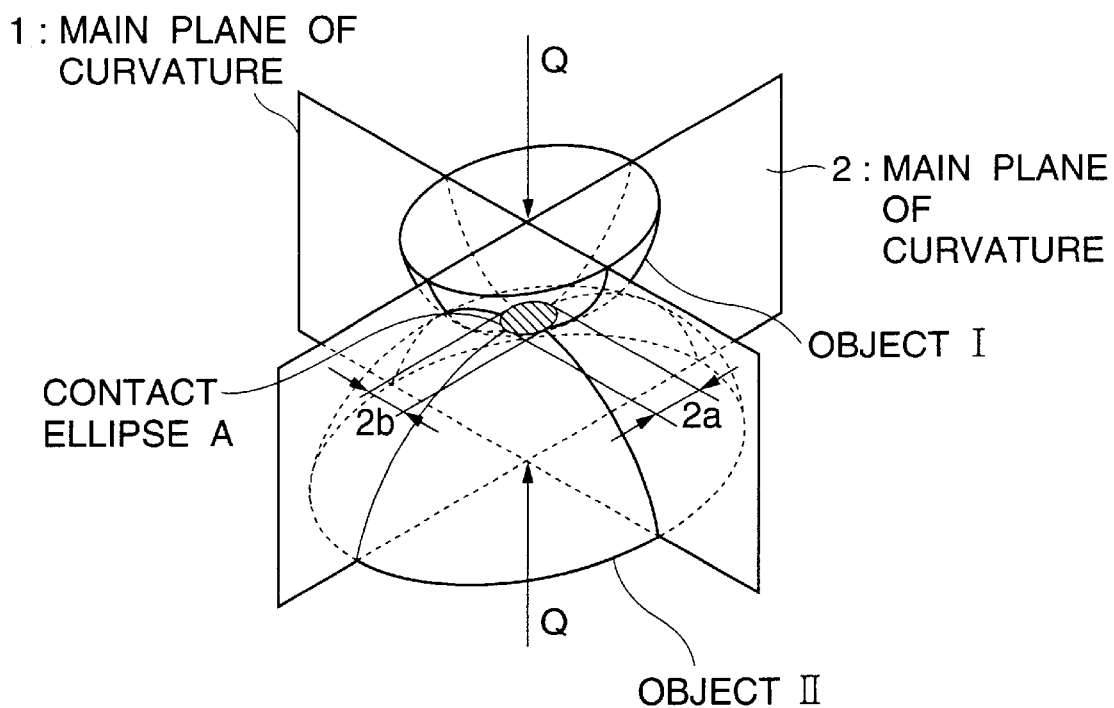
Figure 8B:
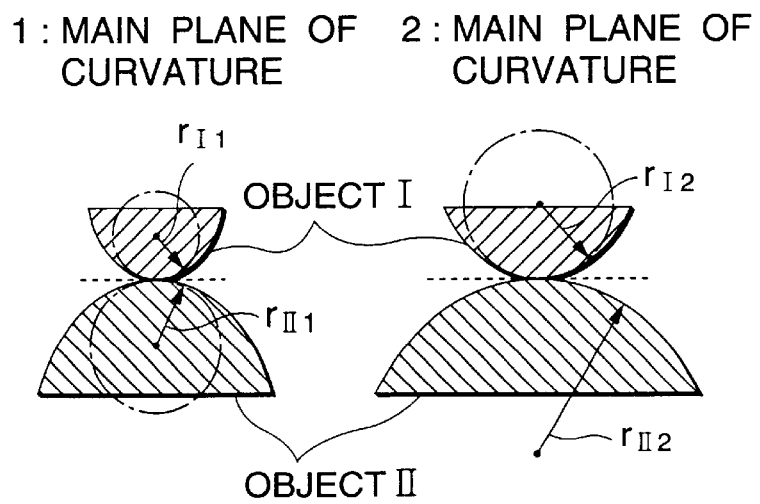
Figure 9:
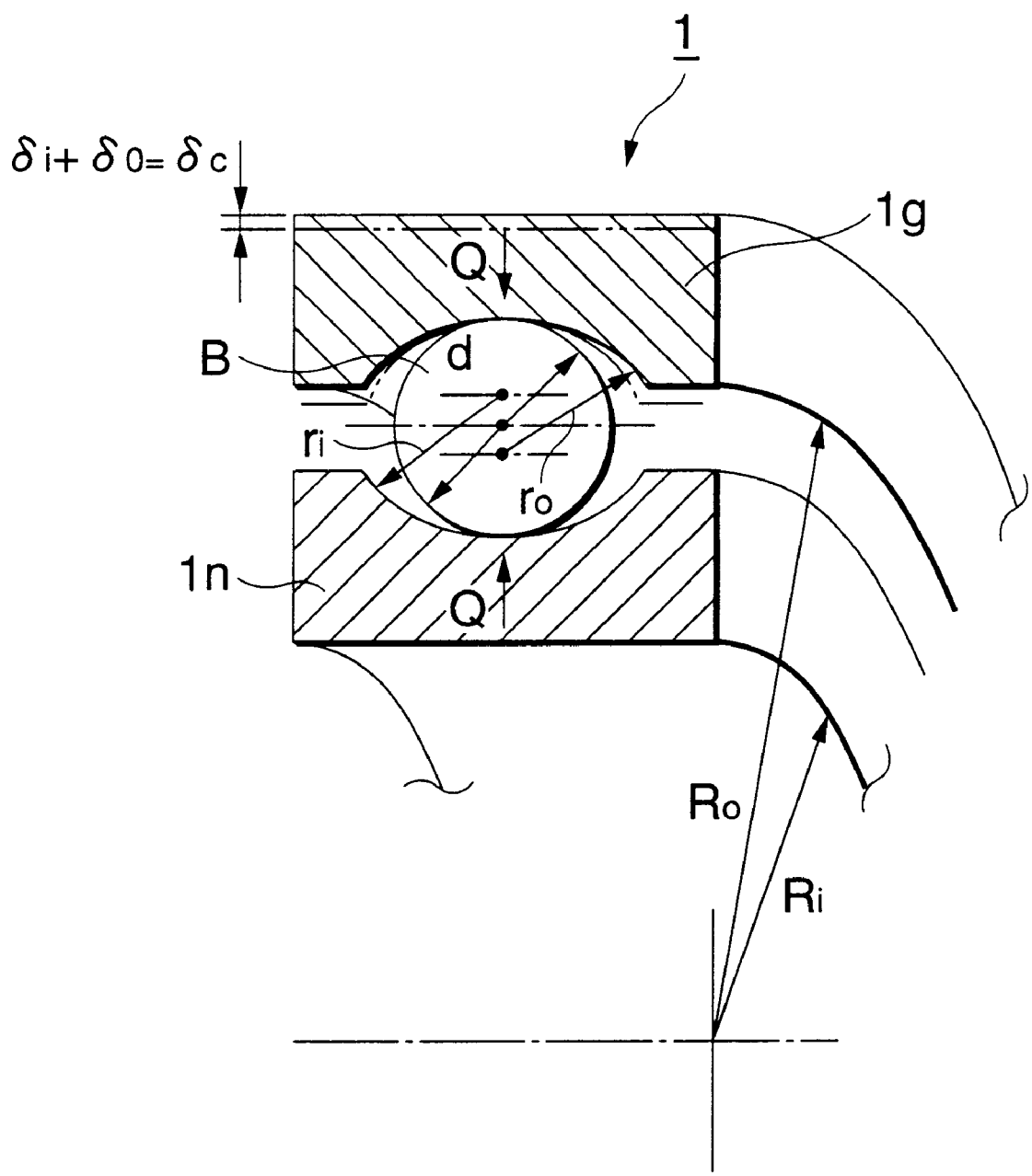
FIG. 9 is a partially sectional view illustrating a deep groove ball bearing.
Figure 10:
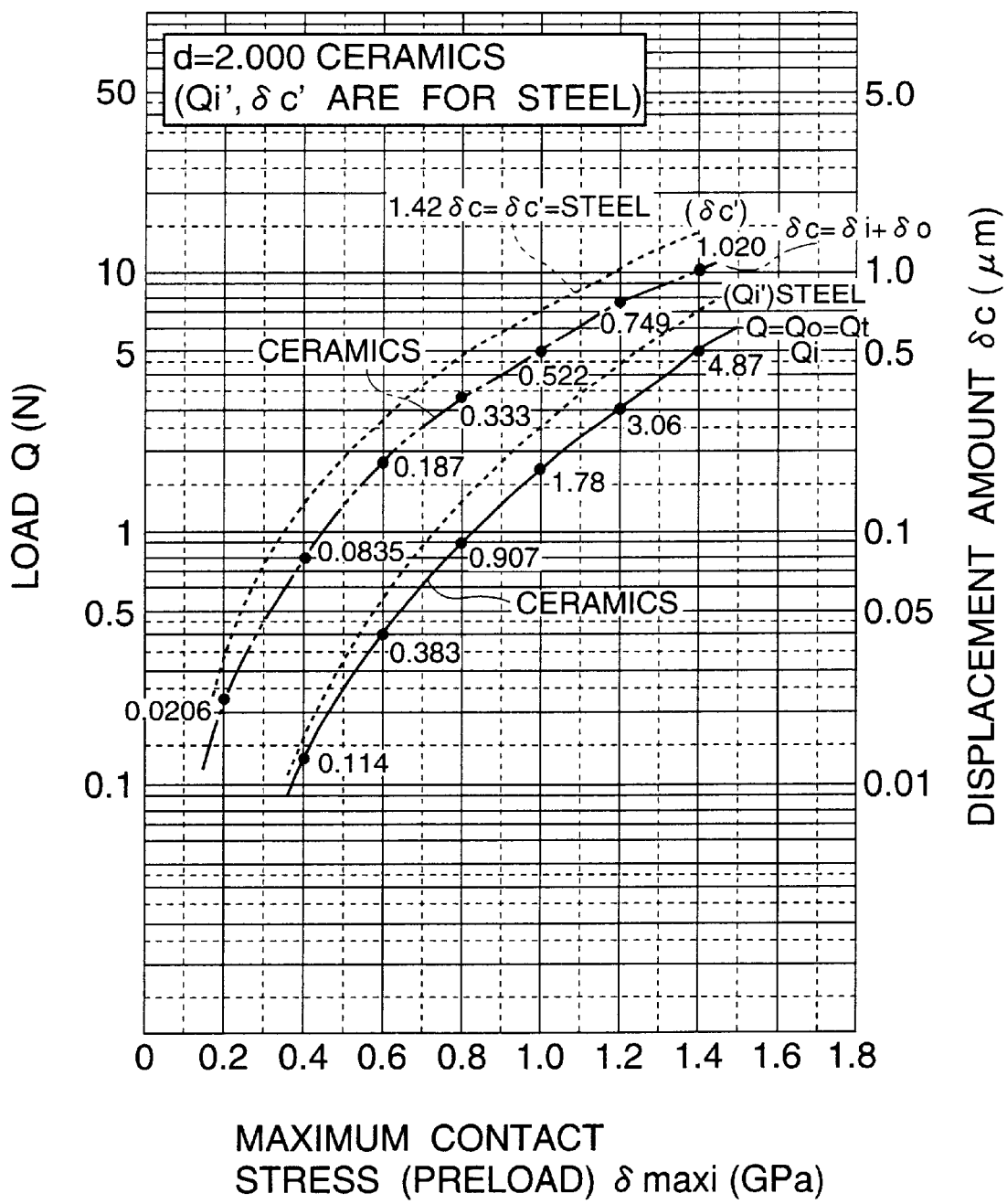
FIG. 10 is a graph illustrating the relationship between the calculated value of load Q-displacement $\delta_c$ and the maximum contact stress $\sigma_{maxi}$ of ceramics ball and steel ball.

In a spindle motor shown in FIG. 6, for example, the bearing device of the invention is designed to support thrust load or form contact angles $\beta1$ and $\beta2$ ($\beta1$ and $\beta2$ may be equal to each other) such that the bearing rigidity is optimum. However, when the bearing clearance increases with the rise in the temperature, the contact angles change according to the change in the gap due to downward force developed by the weight of the rotary unit, and the contact angle $\beta1$ on the upper side of the bearing and the contact angle $\beta2$ on the lower side of the bearing change differently of each other.

Since the precision in rotation of bearing changes with the change in the bearing rigidity, i.e., contact angle, the precision in rotation which has been initially predetermined on the upper and lower sides of the bearing changes. A magnetic disc drive device is one of rotary units having severe requirements for precision in rotation. Accordingly, the present invention is useful in that the difference in the contact angle change between on the upper side and on the lower side of the bearing can be minimized.

As mentioned above, by forming a hard coating film on the rolling element for spindle rolling bearing or swing arm bearing for HDD device, which has severe requirements for fretting resistance, to a thickness of from 0.2 to 2.5 $\mu$m by PVD method, CVD method or ion-plating method, a rolling bearing can be provided which is not liable to fretting and release of preload due to temperature change, exhibits improved acoustic properties and can be produced at a reduced cost.

The foregoing embodiments have been described with reference to ball bearing as rolling bearing. However, it goes without saying that the present invention can be applied to other kinds of rolling bearings which operate at preload (e.g., angular contact ball bearing, tapered roller bearing, self-aligning roller bearing).

As mentioned above, in accordance with the present invention, a hard coating film such as ceramic coating film, electrically-conductive ceramic coating film and DLC coating film is formed on the surface of a spherical body to a thickness of from 0.2 to 2.5 $\mu$m, making it possible to provide a surface-coated spherical body excellent in fretting resistance at a reduced cost.

Further, since the release of preload can be prevented, a bearing device having a long life and good acoustic properties can be provided at a reduced cost.

The present disclosure relate to the subject matter contained in Japanese Patent application Nos. Hei.11-106935 filed on Apr. 14, 1999, Hei.11-045144 filed on Feb. 23, 1999 and Hei.11-045145 filed on Feb. 23, 1999, which are expressly incorporated herein by reference in its entirety.

What is claimed is:

1. A rolling bearing comprising:

an inner race adapted to be fitted to a shaft, an outer race adapted to be fitted to a housing and a plurality of rolling elements, wherein said inner race, said outer race and a base material of said rolling elements are made of a steel having a linear thermal expansion coefficient of $10.1 \times 10^{-6}$ to $13.5 \times 10^{-6}$, each of said rolling elements comprise a hard coating film disposed on an outer surface thereof, having a thickness of 0.2 $\mu$m to 2.5 $\mu$m and being harder than the base material of said rolling elements, said coated outer surface of said rolling element is different in material from raceway surfaces of said inner and outer races, said bearing is adapted to undergo a constant-position preload in the axial direction at the assembling of the bearing with the shaft and the housing.

2. The rolling bearing according to claim 1, wherein said hard coating film is made of a ceramic.

3. The rolling bearing according to claim 1, wherein said hard coating film is made of a diamond-like carbon.

4. The rolling bearing according to claim 1, wherein the base material of said rolling element is a martensite stainless steel.

5. The rolling bearing according to claim 1, wherein said hard coating film comprises an interlayer and a surface layer.

6. The rolling bearing according to claim 5, wherein said interlayer has a thickness of 0.1 $\mu$m to 0.3 $\mu$m.

7. The rolling bearing according to claim 1, wherein said rolling elements are subjected to coating, and said inner and outer races are not subjected to coating.

8. A bearing device comprising:

a shaft;

a housing; and at least two rolling bearings, each of said rolling bearings respectively comprising:

an inner race, an outer race and a plurality of rolling elements, wherein said inner race, said outer race and a base material of said rolling elements are made of a steel having a linear thermal expansion coefficient of $10.1 \times 10^{-6}$ to $13.5 \times 10^{-6}$, and each of said rolling elements comprise a hard coating film disposed on an outer surface thereof, having a thickness of 0.2 $\mu$m to 2.5 $\mu$m and being harder than the base material of said rolling elements, said coated outer surface of said rolling elements is different in material from raceway surfaces of said inner and outer races, said inner races fitted in said shaft such that said rolling bearings are disposed apart from each other in an axial direction of said shaft, said outer races fitted to said housing, and said rolling elements intervened between said inner races and said outer races such that said inner races and said outer races are relatively rotatable, wherein a constant-position preload is applied in the axial direction.

9. The bearing device according to claim 8, wherein said hard coating film is made of a ceramic.

10. The bearing device according to claim 8, wherein said hard coating film is made of a diamond-like carbon.

11. The bearing device according to claim 8, wherein the base material of said rolling element is a martensite stainless steel.

12. The bearing device according to claim 8, wherein said hard coating film comprises an interlayer and a surface layer.

13. The bearing device according to claim 6, wherein said interlayer has a thickness of 0.1 $\mu$m to 0.3 $\mu$m.

14. The bearing device according to claim 8, wherein said axial direction is the direction of gravity.

15. A magnetic recording apparatus comprising a bearing device according to claim 8, wherein said hard coating film is made of an electrically-conductive ceramic.

* * * * *